Sept. 2, 1947.　　　H. C. EVANS ET AL　　　2,426,820
LAMINATED STRUCTURES AND PROCESS OF PREPARING THEM
Filed Dec. 11, 1941
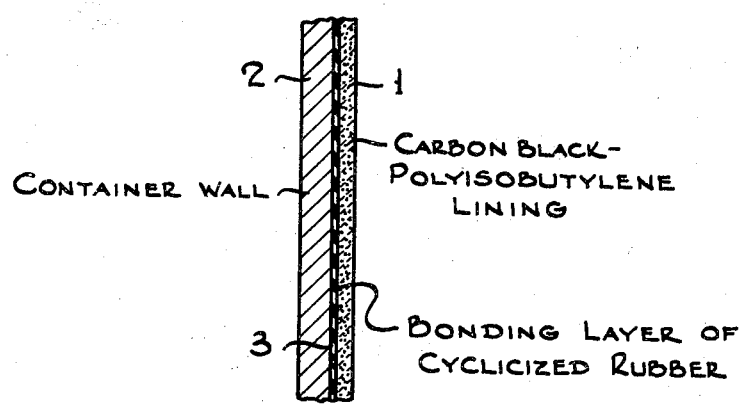
Hector C. Evans
David W. Young    Inventors
by Henry Berk    Attorney Patented Sept. 2, 1947

2,426,820

UNITED STATES PATENT OFFICE 2,426,820

LAMINATED STRUCTURES AND PROCESS OF PREPARING THEM

Hector C. Evans, Cranford, and David W. Young, Roselle, N. J., assignors, by mesne assignments, to Jasco, Incorporated, a corporation of Louisiana Application December 11, 1941, Serial No. 422,544

4 Claims. (Cl. 154—82)

This application relates to protective linings, relates particularly to synthetic polymer linings which are highly resistant to corrosive influences generally, and relates especially to means for attaching corrosion-resistant liners to metal containers.

Many manufacturing processes require the use of non-corrosive ducts and containers, particularly large tanks for storage and for the conducting of a wide range of chemical reactions; and many attempts have been made to develop corrosion-resisting linings for use with containers for various materials. These proposed linings have included such substances as tin or lead, or vitreous glass or enamels, or plated coatings such as chromium, copper alloys, and even the noble metals, including gold and platinum, and even various paints, enamels and lacquers have been proposed as protective linings, but to the present no generally satisfactory corrosion-resistant lining has been developed. All of the metal coatings are soluble in one or another of the acids. The vitreous coatings are soluble to a more or less extent in the alkalis, and the paint and enamel coatings are all subject to destruction by acid and oxidizing substances and they are resistant to only a very limited number of the organic solvents. Furthermore, many substances which require processing by the more strongly reactive reagents are seriously injured by the presence of minute traces of metal oxides derived from the container. It has even been suggested that rubber be used as container linings, but rubber oxidizes readily, and is far from proof against the attack of acids, alkalis and solvents.

Among the more resistant materials which have been discovered are the olefinic polymers, such as polyisobutylene, and this material has been suggested for use as a corrosion-resistant liner for various types of containers, but to the present it has not been satisfactory, because of the difficulty of attaching it to the container; this difficulty being sufficient to prevent almost completely any commercial use of polyisobutylene as a corrosion-resistant lining for containers.

The present invention presents a means for obtaining a firm, strong bond between a metal or other material container and a lining of polyisobutylene, to hold the polyisobutylene lining layers firmly in position and maintain the lining in position sufficiently well to avoid sagging and thinning out from cold flow.

The invention consists, in combination, of the steps of compounding into the polyisobutylene (polymers having a molecular weight preferably above 30,000, or better, above 80,000), and combining with the compounded polymer a particular adhesive in the form of cyclized rubber. It is known that these adhesives will adhere firmly to metal or other types of containers, but they do not adhere to polyisobutylene in the pure form. Likewise, polyisobutylene in pure form can be made to adhere to some extent to metal surfaces by the use of a solvent, if the molecular weight is below about 25,000, bringing the material within the range of fluid character, so that it becomes practically a liquid layer held in place by surface tension, but such material does not stay in place, but instead flows downward within a few days to a few weeks, leaving the upper surface essentially uncoated.

The present invention is based upon the discovery that if the polyisobutylene is admixed with from 100 parts to 250 parts of carbon black, per 100 parts of polymer, especially if the molecular weight of the polymer is above about 30,000, preferably above 50,000 to 60,000, and advantageously still higher, as between 100,000 and 350,000, it can be bonded firmly to metal by such substances as the above-mentioned cyclicized rubber and when materials of this molecular weight are compounded as above indicated with carbon black, the lining of polyisobutylene stays firmly and solidly in place within the container.

Thus an object of the invention is to attach a lining of polyisobutylene firmly to a container and simultaneously prevent distortion and flow of the layer from one point to another within the container. Other objects and details of the invention will be apparent from the following description.

In the accompanying drawing is illustrated diagrammatically a sectional view of a laminated structure showing how a lining (1) of polyisobutylene suitably mixed with carbon black may be bonded satisfactorily to a metal container wall (2) by a layer (3) of cyclicized rubber cement.

In practicing the invention, a polymer of isobutylene is prepared by a low temperature polymerization procedure, in which gaseous isobutylene is condensed and cooled to temperatures ranging from −10° C. to −100° C., or even lower, preferably by the use of a refrigerant such as solid carbon dioxide, or a diluent-refrigerant such as liquid ethylene or liquid methane, or other convenient refrigerant; with or without a low freezing alkyl halide as a diluent. The cooled olefin is then polymerized by the application of a Friedel-Crafts type catalyst such as boron trifluoride, or such as aluminum chloride dissolved in a low freezing non-complex forming solvent such as ethyl or methyl chloride or carbon disulfide or similar solvent. When a large portion of the isobutylene has polymerized, the reaction is quenched by combining with the polymerization mix, a suitable alkali or oxygenated organic compound such as an alcohol, or an aldehyde, or an acid, or either organic or inorganic or alkalis such as ammonia or caustic solutions in water or other alkali substances.

The polymer is then separated from the reaction mixture, either by pouring off the residual diluent-refrigerant and unpolymerized material, or by straining out the solid polymer from the residual liquids; or by warming up the mixture to volatilize the volatile components of the reaction mix. Such polymers are substantially saturated hydrocarbons with a molecular weight preferably ranging from 30,000 to 350,000, or even higher; the higher molecular weights yielding the stiffer materials. This material is practically chemically saturated, having an iodine number ranging from 1 or 2 down to a small fraction of 1, depending upon the molecular weight.

Workers in the art are of the opinion that there remains in each molecule of polymer one double bond derived from the original olefin. Actually, when the molecular weight is very high, the number of double bonds per gram of polymer is relatively small, as indicated by the exceedingly low, or practically unmeasurable, iodine number. The polymer is plastic and elastic, much like rubber, and is to all intents and purposes a saturated, aliphatic hydrocarbon with a chemical inertness practically that of other saturated hydrocarbons. The polymer is, in fact, substantially completely non-reactive with any inorganic salt, either as such or in water solution. It is substantially completely inert with respect to alkalis of any kind, either as such or in water solution or at temperatures below about 150° C. The polymer is substantially wholly inert to acids, either as such or in water solution at temperatures below about 200° C. The polymer is reactive with the free halogens. The polymer is substantially inert with respect to practically all of the low molecular weight oxygenated organic solvents, including the alcohols, the aldehydes, the organic acids and the esters. The polymer is soluble in the hydrocarbons and in all the liquid chlorinated hydrocarbons with dielectric constants below about 8 at room temperature.

The polymer with the above characteristics is then compounded with from 100 parts to 250 parts of carbon black per 100 parts of polymer. The carbon black stiffens the polymer and reduces its flexibility and substantially completely destroys any tendency towards cold flow of the material. Likewise, the carbon black produces the unexpected phenomenon of causing adhesion or interlocking between the compounded polymer and a cyclicized rubber substance which in turn will adhere to metal, wood or other surfaces, to which the polymer alone adheres poorly, while the uncompounded polymer does not adhere to the cyclicized rubber.

In preparing the container or duct for the application of the polymer liner, the surfaces to be covered are cleaned to free them from oxidized layers and all traces of grease or oil. The metal surfaces particularly are preferably cleaned by thorough sandblasting or pickling in acid or other means until the metal surface is bright and free from all traces of dirt or oxidized layers. The surface is then coated with a preliminary layer of the cyclicized rubber cement, having the constitution above pointed out. This coating compound is preferably prepared by treating a cyclicized rubber produced as pointed out by U. S. Patent No. 1,605,180 issued to Harry L. Fisher or as pointed out in U. S. Patent No. 1,744,880 issued to William C. Geer. The cyclicized rubber prepared as shown in these patents is preferably dissolved in a convenient solvent such as petroleum naphtha or other organic solvent to bring it into a flowable, spreadable condition. When the coating of cyclicized rubber has been applied, it is allowed to dry thoroughly to remove the major portion of solvent and if possible, substantially all of the solvent, at least 45 minutes' drying time being desirable. During this time the compounded polymer is desirably sheeted out on a roll mill or by other means, to the proper thickness for the lining member. When the first coat of cyclicized rubber upon the container is thoroughly dry, a second layer of cyclicized rubber in solvent is applied and then a layer of the same cyclicized rubber solution is applied to one side of the sheeted out polymer compound. Both are allowed to dry simultaneously until all wetness disappears and the surfaces are tacky. The cement-covered surface of the polymer is then brought against the tacky cyclicized rubber layer on the inner surface of the container and the sheet of polymer is rolled down under heavy pressure against the container. The lining is preferably held in place by substantial pressure until the cement is fully dry, preferably for at least three days.

When thoroughly dry, the polymer is found to be held firmly in place on the container surface, and to afford a very high grade protection to corrosion by liquids generally upon the container surface. The lining may be applied to metal tanks made from either iron, steel, brass, bronze, zinc, terne-plate or other structural metals. It is found to provide an equally satisfactory lining for containers or ducts made of wood or fibre or ceramic materials generally, as well as stone or brick; and in fact the combination of cyclicized rubber and carbon black filled polymer sheet will hold to substantially any solid substance and protect that substance from corrosion by acid, alkali, fumes, oxidation and destructive influences generally. The layer, as so prepared, shows an excellent tensile strength, an excellent resistance to abrasion and a good flexure resistance, as well as an outstandingly high resistance to corrosive attack generally. Furthermore, the adhesion between the cyclicized rubber and the container body and the adhesion between the cyclicized rubber and the carbon black loaded polymer is very high, sufficiently high to prevent stripping of the polymer sheet from the container and the lining can be removed only by long continued abrasion or cutting away from the container body.

*Example 1*

100 parts of polyisobutylene (polybutylene) were mixed on the mill with 200 parts of "Spheron" carbon black and with 1 part of paraffin wax. This compound was prepared by placing the polymer in a Banbury mill and the carbon black and paraffin were then added to it and milled in the Banbury mill until a homogeneous composition was obtained. (Alternatively, an open roll mill could have been used or the Werner and Pfleiderer type of kneader could have been used but a Banbury mill is preferable because of the more rapid mixing action.) When an homogeneous mixture was obtained, the material was transferred to a roll mill calender at a temperature of about 190° F., sheeted out into sheets having a thickness of approximately ⅛". These sheets of polymer were suitable for immediate use for the coating operation or were suitable for storage for substantial periods of time before use. If they are to be stored, it is preferable that they be interleaved with Holland cloth in order to prevent "blocking" or adhesion between the layers which may occur upon prolonged standing. When the lining operation is to be conducted, the container or duct is cleaned as above described, treated with a layer of cyclicized rubber as above described, then the sheet of polymer and the container are treated with further coats of cyclicized rubber; and the lining applied and finished as above described.

Upon test, this container was found to be fully resistant to sulfuric acid of 98% strength, and after 30 days of an application of 98% of sulfuric acid, to the container lining, at room temperature, the surface of the container showed a slight glazing which had appeared within the first day or two and did not show any signs of increasing with the passage of time. A similar container likewise similarly are without effect upon the polymer lining. None of the low molecular weight alcohols, aldehydes or ethers showed any effect upon this lining in intervals of 30 days. Similarly, none of the alkalies such as caustic sodas, caustic potash, lime slurry, barium sulfide, ammonium hydroxide, sodium carbonates and the like, either hot or cold, showed any effect upon the lining. High concentrations of chlorine showed a substantial effect upon the lining and converted it into a chlorinated organic substance which eventually reached a sufficiently high chlorine content to lose its strength and elasticity and to break away from the underlying material. However, even with such high concentrations of chlorine this reaction was relatively slow, indicating many months or years of service, depending upon the thickness of the lining and the concentration of the chlorine.

*Example 2*

In order to determine the strength of the polymer coating and the strength of adhesion to the container, circular disks of steel, threaded on the edges for attachment to a tensile strength testing machine, were prepared by the application of the cyclicized rubber to the respective surfaces of the metal disks, and the disks were then attached by the cyclicized rubber to opposite side of a 0.375" thick sheet of polymer compounded with Spheron black, as in Example 1. The tensile strength of the bond and of the polymer material was then tested by a tensile strength tester, according to the Yerzley modification of the A. S. T. M. method, No. D429–39T, with results as shown in the following table:

*Table I*

| Sample No. | 1 | 2 | 3 | 4 | 5 | 6 | 7 |
|---|---|---|---|---|---|---|---|
| Composition of Tank Lining | ⅓ B-100, ⅔ Spheron trace wax. | Same | Same | Same | Same | Same | Same. |
| Adhesion Material | Vulcalock | Same | Same | Same | Same | Same | Same. |
| Time of Cure | 72 hrs | 72 hrs | 36 hrs | Same | Same | Same | Same. |
| Temp. of Cure | 100° C. to room temp | 100° C. to room temp | Room | Room | Room | Room | Room. |
| Temp. of Adhesion test | Room temp | Same | Same | Same | Same | Same | Same. |
| A. S. T. M. Adhesion to steel in lbs. per sq. in | 905 | 225 | 653 | 654 | 550 | 705 | 60. | was allowed to hold 50% sulfuric acid at a temperature of approximately 60° C. and at the end of 30 days, no perceptible change had occurred in the lining. In neither of these instances, was there any discoloration of the acid. Similarly, cold concentrated nitric acid produced no effect on a third lining in the course of 30 days, and diluted nitric acid at elevated temperatures in the neighborhood of 60° likewise produced no noticeable effect. Hot 98% sulfuric acid produced a small but measurable effect upon the polymer, indicating that the life of the lining would not be unlimited in contact with hot concentrated sulfuric acid but indicating also that the life would be many months before the attack by the sulfuric acid reached such proportions as to effect the underlying metal. Similarly, hot concentrated nitric acid showed a low rate of attack upon the polymer although the rate of attack was greater than hot concentrated sulfuric acid. An acetic acid in any concentration or at any temperature showed no attack upon the polymer over a period of 30 days. Hydrofluoric, hydrochloric and the halogen acids likewise have no influence upon the polymer lining at any temperature below the boiling point. All of the organic acids in any concentration and at any temperature below the volatilization temperature These results show the high strength of both the bond and the polymer. In each case, rupture occurred at least 90% within the stock and 10% at the seal. Under the same conditions of making sample and testing, pure gum and less loaded stocks, 100 parts gum, 25 to 75 parts carbon black, gave bonds too poor to test.

*Example 3*

It is found that the amount of carbon black which can be added to the polymer and still retain the adhesiveness between the polymer and the cyclicized rubber is limited. The effective range varies with the character of the carbon black, and the character of the polymer; but is usually within 5% of the amount either side of the optimum. With the Spheron carbon black, which is a hard carbon black, the minimum amount of carbon black which will provide reasonable adhesion between the cyclicized rubber and the compounded polymer, is approximately 200 parts per 100 parts of the polymer and less than about 100 parts does not yield adhesion and more than about 250 parts also does not yield adhesion. However, in some instances, it is desirable for maximum corrosion resistance of the polymer, to incorporate as much as 300 parts of carbon black per 100 parts of the polymer. Unfortunately, however, such large amounts yield a material which does not adhere to the cyclized rubber. It is found, however, that such a high black compound will adhere to a lower black compound which in turn can be adjusted to adhere to the cyclized rubber with the cyclized rubber adhering to the container surface.

For this purpose, a composition was prepared containing 100 parts of polyisobutylene (polybutylene) with 300 parts of Spheron carbon black by mixing in the Banbury mill as in Example 1. Simultaneously, another composition was prepared consisting of polyisobutylene (polybutylene) 100 parts and Spheron carbon black 200 parts as in Example 1. The container surface was prepared by cleaning as previously indicated, coating with cyclized rubber and then recoating the container and coating the sheet of lower carbon black content polymer, drying them to a tackiness and rolling down the polymer on to the cyclicized rubber-treated surface. Thereafter, sheets of the high carbon black polymer were rolled down on top of the lining of lower carbon black polymer and it was found that these two layers adhered sufficiently firmly to yield a satisfactory lining in which the exposed surface contained the desired high proportion of carbon black. This procedure is applicable to practically any desired content of carbon black, and the limit has not as yet been determined although it is believed that at least 800 to 900 parts of carbon black per 100 parts of polymer by weight could be prepared and adhered to the inner surface of the container.

*Example 4*

A series of test samples were prepared with coatings of cyclicized rubber, and they were attached by the cyclicized rubber to opposite sides of a similar sample of high molecular weight polyisobutylene containing no carbon black. The test showed that there was substantially no adhesion to the polyisobutylene, showing that the presence of the carbon black is vital to the adhesion between the cyclized rubber and the polymer.

This adhesion is believed to be due to an interlocking effect between the particles of carbon black, the polyisobutylene and the cyclized rubber cement. The phenomenon observed suggests the possibility that the polymer does not wet the carbon black, but adheres to one side of the particles of carbon black, leaving the other side of the particles free to be wet or adhered to by the cyclized rubber, each particle serving actually as a binding point extending through the interface between the cyclized rubber and the polyisobutylene. Obviously, the larger the proportion of carbon black, the greater the number of points of adhesion and the firmer the bond between the polymer and the cyclized rubber.

*Example 5*

In some instances, it is desirable to use as a liner a layer of polyisobutylene having less than 50 parts of carbon black to 100 parts of polymer since with some solvents, the presence of carbon black somewhat increases the permeability of the polymer layer. Coatings of this type are readily obtained by applying to the container the layer of cyclicized rubber as in Example 1, followed by a layer of polymer containing between 50 and 200 parts of carbon black per 100 parts of polymer and then the application over this layer of a layer of polymer containing less than 50 parts of carbon black to 100 parts of polymer or even entirely free from carbon black. This is readily accomplished by moistening the respective surfaces of the carbon black compounded polymer and the "pure gum" polymer with a convenient solvent, such as 54° naphtha, or gasoline, or benzol, or the like, and rolling down the second layer of polymer into contact with the first and allowing the solvent to dry out.

Thus the invention provides a new and useful tank lining, consisting of a mixture of polyisobutylene with carbon black attached to a tank lining by the bonding effect of the carbon black to a layer of cyclized rubber in combination with the bonding effect between the cyclized rubber and the container material or container body.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. In combination, a container, a layer of cyclicized rubber thereon, and attached to said layer, a layer of polyisobutylene having a molecular weight above about 30,000 homogeneously mixed with 100 to 250 parts of hard carbon black and a trace to 1 part of paraffin wax per 100 parts of the polyisobutylene.

2. In combination, a container, a layer of cyclicized rubber adherent thereon, and bonded to said cyclicized rubber layer an intermediate layer of polyisobutylene homogeneously mixed with 100 to 250 parts of hard carbon black and a trace to 1 part of paraffin wax per 100 parts of the polyisobutylene, and an outer protective layer comprising polyisobutylene having a molecular weight above about 30,000 adherent to said intermediate layer.

3. A process for preparing a protective lining for a metal container, comprising the steps of applying to a surface of the container to be protected a layer of cyclicized rubber dissolved in an organic solvent, drying out said layer by evaporating the solvent, and applying with pressure to the thus-dried layer of cyclicized rubber a layer of polyisobutylene having a molecular weight above about 30,000 homogeneously mixed with 100 to 250 parts of hard carbon black and a trace to 1 part of paraffin wax per 100 parts of the polyisobutylene.

4. A process of protecting a metal surface of a container, comprising the steps of mixing and milling with polyisobutylene having a molecular weight above about 30,000 a proportion of 100 to 250 parts of hard carbon black and a trace to 1 part of paraffin wax per 100 parts of the polyisobutylene until a homogeneous composition is thus obtained, calendering said composition into a sheet, applying a cement coating of cyclicized rubber dissolved in a solvent to a surface of the sheet, applying a cement coating of the cyclicized rubber dissolved in a solvent to the metal surface to be protected, drying said cement coatings by evaporating the solvents therefrom until the coatings are tacky, and pressing the sheet with its dried cement coating against the dried cement coating on the metal surface.

HECTOR C. EVANS.
DAVID W. YOUNG.

(References on following page)

REFERENCES CITED

The following references are of record in the file of this patent:

UNITED STATES PATENTS

| Number | Name | Date |
|---|---|---|
| 1,617,588 | Geer | Feb. 15, 1927 |
| 2,248,071 | Fisher | July 8, 1941 |
| 2,218,167 | Harkins | Oct. 15, 1940 |
| 2,311,308 | Thomas et al. | Feb. 16, 1943 |
| 2,312,024 | Brown | Feb. 23, 1943 |
| 2,316,706 | Mueller-Cunradi | Apr. 13, 1943 |

FOREIGN PATENTS

| Number | Country | Date |
|---|---|---|
| 500,542 | Great Britain | May 10, 1937 |

OTHER REFERENCES

B. J. Habgood, Transactions of the Institution of the Rubber Industry, vol. 13, pp. 136–159.